(12) United States Patent
Berkhout et al.

(10) Patent No.: US 10,609,948 B2
(45) Date of Patent: Apr. 7, 2020

(54) 3D PRINTER SYSTEM AND METHOD FOR FILLING A CARTRIDGE OF SUCH A SYSTEM

(71) Applicant: Nederlandse Organisatie voor toegepast-natuurwetenschappelijk onderzoek TNO, s-Gravenhage (NL)

(72) Inventors: Mara Berkhout, 's-Gravenhage (NL); Andries Rijfers, 's-Gravenhage (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 178 days.

(21) Appl. No.: 15/578,768

(22) PCT Filed: Jun. 6, 2016

(86) PCT No.: PCT/NL2016/050402
§ 371 (c)(1),
(2) Date: Dec. 1, 2017

(87) PCT Pub. No.: WO2016/200254
PCT Pub. Date: Dec. 15, 2016

(65) Prior Publication Data
US 2018/0168217 A1    Jun. 21, 2018

(30) Foreign Application Priority Data
Jun. 8, 2015 (EP) .................................... 15170963

(51) Int. Cl.
*B33Y 30/00*    (2015.01)
*B33Y 40/00*    (2020.01)
(Continued)

(52) U.S. Cl.
CPC .............. *A23P 30/00* (2016.08); *A21C 11/00* (2013.01); *A23P 20/20* (2016.08); *B29C 64/106* (2017.08);
(Continued)

(58) Field of Classification Search
CPC ...................................................... A23P 30/00
See application file for complete search history.

(56) References Cited

U.S. PATENT DOCUMENTS 3,262,404 A * 7/1966 Morz ..................... A21C 11/16
                                                   425/183
3,690,805 A * 9/1972 Kopicko ................. B30B 11/04
                                                   425/352
(Continued)

FOREIGN PATENT DOCUMENTS

WO    2012/103005 A2    8/2012

OTHER PUBLICATIONS

XYZprinting, XYZprinting Food Printer at CES 2015, Jan. 11, 2015, Youtube (Year: 2015).*

(Continued)

*Primary Examiner* — Leith S Shafi
*Assistant Examiner* — Nicholas J Chidiac
(74) *Attorney, Agent, or Firm* — Banner & Witcoff, Ltd.

(57) ABSTRACT

A cartridge assembly (3) of a 3D printer system for printing a plastic substance, such as a dough, comprises a refillable cartridge (31) and a punch-fill adapter (32) having a circumferential cutting edge (26) and being provided with a punch-fill connector (24) to form a manually releasable interconnection between the cartridge and the punch-fill adapter. When said interconnection is effective, the cartridge assembly is effective as a manual tool for punching, by means of said circumferential cutting edge, punched slices out of a supply slice of said plastic substance, and thereby (Continued)

for automatically inserting said punched slices into the inner space of the cartridge. Thanks to this punch-fill connector the manual (re)filling of the cartridge can be performed more easily and more reliably.

5 Claims, 6 Drawing Sheets

(51) Int. Cl.
*A23P 30/00* (2016.01)
*B29C 64/106* (2017.01)
*B29C 64/20* (2017.01)
*A21C 11/00* (2006.01)
*A23P 20/20* (2016.01)
*A23P 20/25* (2016.01)

(52) U.S. Cl.
CPC .............. *B29C 64/20* (2017.08); *B33Y 30/00* (2014.12); *B33Y 40/00* (2014.12); *A23P 2020/253* (2016.08)

(56) References Cited

U.S. PATENT DOCUMENTS

| | | | |
|---|---|---|---|
| 6,708,853 B1 * | 3/2004 | Melling | A21C 11/18 |
| | | | 222/391 |
| 8,506,283 B1 * | 8/2013 | Gonzales | B30B 11/02 |
| | | | 249/122 |
| 2013/0089642 A1 | 4/2013 | Lipson et al. | |

OTHER PUBLICATIONS

Sep. 26, 2016—International Search Report and Written Opinion of PCT/NL2016/050402.

* cited by examiner

3D PRINTER SYSTEM AND METHOD FOR FILLING A CARTRIDGE OF SUCH A SYSTEM

CROSS-REFERENCE TO RELATED APPLICATIONS

This application is a U.S. National Stage application under 35 U.S.C. § 371 of International Application PCT/NL2016/050402 (published as WO 2016/200254 A1), filed Jun. 6, 2016 which claims the benefit of priority to Application EP 15170963.1, filed Jun. 8, 2015. Benefit of the filing date of each of these prior applications is hereby claimed. Each of these prior applications is hereby incorporated by reference in its entirety.

The invention relates to a 3D printer system for printing a plastic substance, such as a dough, wherein the 3D printer system comprises:
a support structure;
a cartridge assembly, comprising a refillable cartridge, which cartridge comprises a circumferential wall having a cylindrical inner surface defining a cylindrical inner space of the cartridge for holding said plastic substance therein, said circumferential wall being provided with a first cartridge connector and a second cartridge connector at the two opposing longitudinal ends of the cartridge, respectively;
a plunger assembly, comprising a plunger and a plunger assembly connector, wherein the first cartridge connector and the plunger assembly connector are configured to cooperatively form a manually releasable first interconnection between the cartridge and the plunger assembly;
a printhead assembly, comprising a printhead assembly connector, wherein the second cartridge connector and the printhead assembly connector are configured to cooperatively form a manually releasable second interconnection between the cartridge and the printhead assembly;
a plunger actuating mechanism; and
a 3D movement mechanism;
and wherein the 3D printer system has an operation condition, in which:
said cylindrical inner space of the cartridge contains said plastic substance;
said first interconnection and said second interconnection are effective;
the plunger actuating mechanism is effective to actuate the plunger for movement within said cylindrical inner space to thereby push the plastic substance successively out of the cartridge, through the printhead assembly, and out of the printhead assembly; and
the 3D movement mechanism is effective to provide relative movement, according to predetermined 3D movement trajectories, between said support structure, on the one hand, and at least the plunger assembly, the cartridge and the printhead assembly, on the other hand.

The invention also relates to a method for filling such a cartridge of such a cartridge assembly of such a 3D printer system as described above.

It is noted that in the present document the term "plastic substance" may for example (but not exclusively) refer to a dough, such as a pasta dough, or another edible dough. However, as used herein, said term may also refer to various other edible or non-edible substances, being plastic in the sense that they can easily be shaped/moulded/kneaded, and being printable by means of a 3D printer. For example, clay may be one of said various other plastic substances as used herein. For providing an appealing example in relation to explaining the present invention, the plastic substance hereinafter for the most part is taken to be a pasta dough, and is referred to as "pasta dough", or simply "dough".

3D printer systems of the type as initially identified hereinabove are known from practice. From practice it has appeared that (re)filling cartridges of said known 3D printer systems by hand, or by a simple handtool, is cumbersome and unreliable. For example, it is known from practice to use a simple handtool in the form of a spatula for successively pushing portions of pasta dough into a cartridge until the cartridge is completely filled. This is a labour-intensive activity, and there is a high risk of creating air inclusions within dough which has been inserted into the cartridge. Of course, the occurrences of such air inclusions are very undesirable, as they will result in unpredictable interruptions in the dough dispensing from the printhead assembly during 3D printing.

It is an object of the invention to provide a solution according to which the manual (re)filling of such cartridges can be performed more easily and more reliably.

For that purpose the invention provides a 3D printer system according to the appended independent claim 1, as well as a method for filling a cartridge according to appended independent claim 3. Preferable embodiments of the invention are provided by the appended dependent claims 2 and 4.

Hence, the invention provides a 3D printer system of the type as initially identified hereinabove, which 3D printer system is further characterized in that the cartridge assembly further comprises a punch-fill adapter having a circumferential cutting edge and being provided with a punch-fill connector, wherein:
the first cartridge connector and the punch-fill connector are configured to cooperatively form a manually releasable third interconnection between the cartridge and the punch-fill adapter, when said first interconnection is manually released; and/or
the second cartridge connector and the punch-fill connector are configured to cooperatively form a manually releasable fourth interconnection between the cartridge and the punch-fill adapter, when said second interconnection is manually released;
and wherein the cartridge assembly has a punch-fill condition, in which:
said third interconnection or said fourth interconnection is effective;
said circumferential cutting edge is arranged in-line, as seen in longitudinal direction of the cartridge, with the cross-sectional circumferential geometry of the cylindrical inner surface of the circumferential wall of the cartridge; and
the cartridge assembly is effective as a manual tool for punching, by means of said circumferential cutting edge, punched slices out of a supply slice of said plastic substance, and thereby for automatically inserting said punched slices into the inner space of the cartridge.

Thanks to this punch-fill adapter, which can be attached to the cartridge with its circumferential cutting edge in-line with the cartridge in the said manner, the cartridge assembly can be used very easily for simultaneous punching and insertion of slices of the plastic substance into the inner space of the cartridge, in such manner that the slices perfectly fit within the inner space of the cartridge, thus preventing the occurrence of air inclusions within the plastic substance being inserted into the cartridge.

In a preferable embodiment of the invention, the cartridge assembly further comprises a handgrip adapter having a handgrip area and being provided with a handgrip connector, wherein:

the first cartridge connector and the handgrip connector are configured to cooperatively form a manually releasable fifth interconnection between the cartridge and the handgrip adapter, when said first interconnection is manually released; and/or the second cartridge connector and the handgrip connector are configured to cooperatively form a manually releasable sixth interconnection between the cartridge and the handgrip adapter, when said second interconnection is manually released;

and wherein the cartridge assembly has a handgrip condition, in which:

said fifth interconnection or said sixth interconnection is effective; and said handgrip area can manually be taken hold of during said punching.

This handgrip adapter with its handgrip area provides comfort and protection of hands during said punching.

The abovementioned aspects and other aspects of the invention will be apparent from and elucidated with reference to the embodiment described hereinafter by way of non-limiting example only and with reference to the schematic figures in the enclosed drawing.

Figure 3:
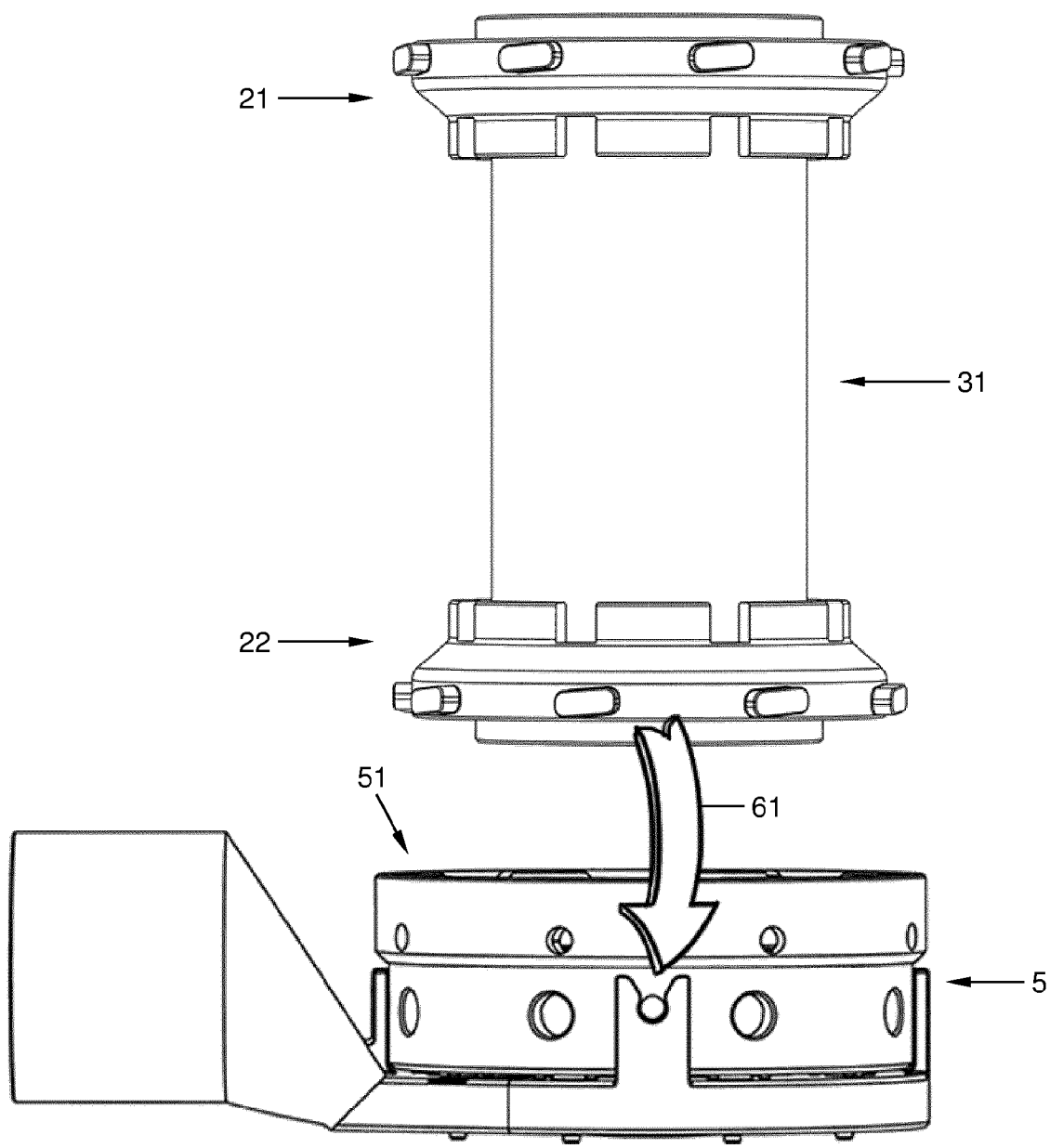

FIG. 3 separately shows, in a side view, the cartridge and printhead assembly of the previous figures again, however this time after the user has further disconnected the second interconnection between the cartridge and the printhead assembly.

Figure 4:
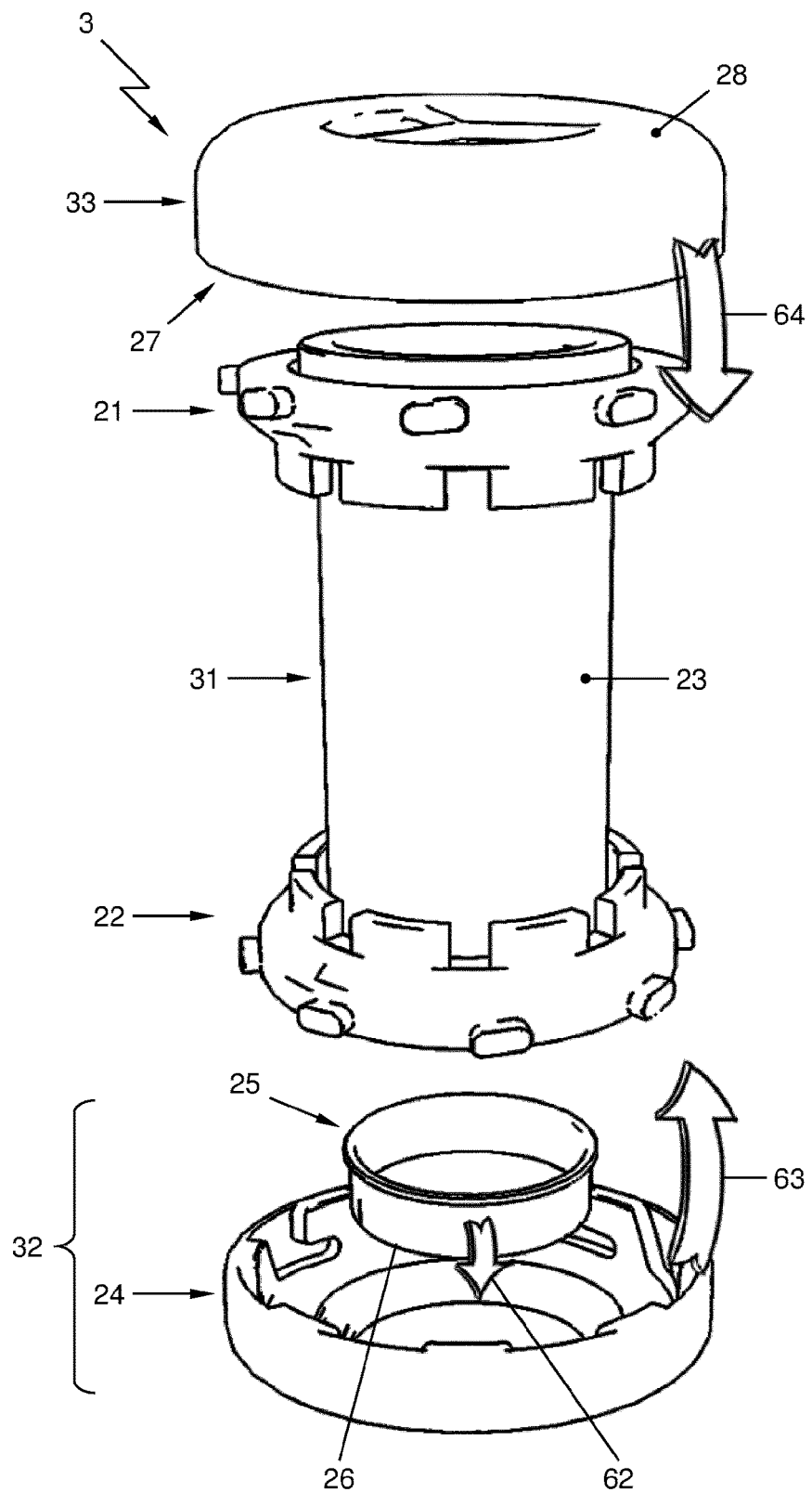

FIG. 4 shows, in a perspective view, the cartridge of the previous figures again, however, this time together with the abovementioned punch-fill adapter and the abovementioned handgrip adapter, these two adapters not yet being connected to the cartridge.

Figure 5:
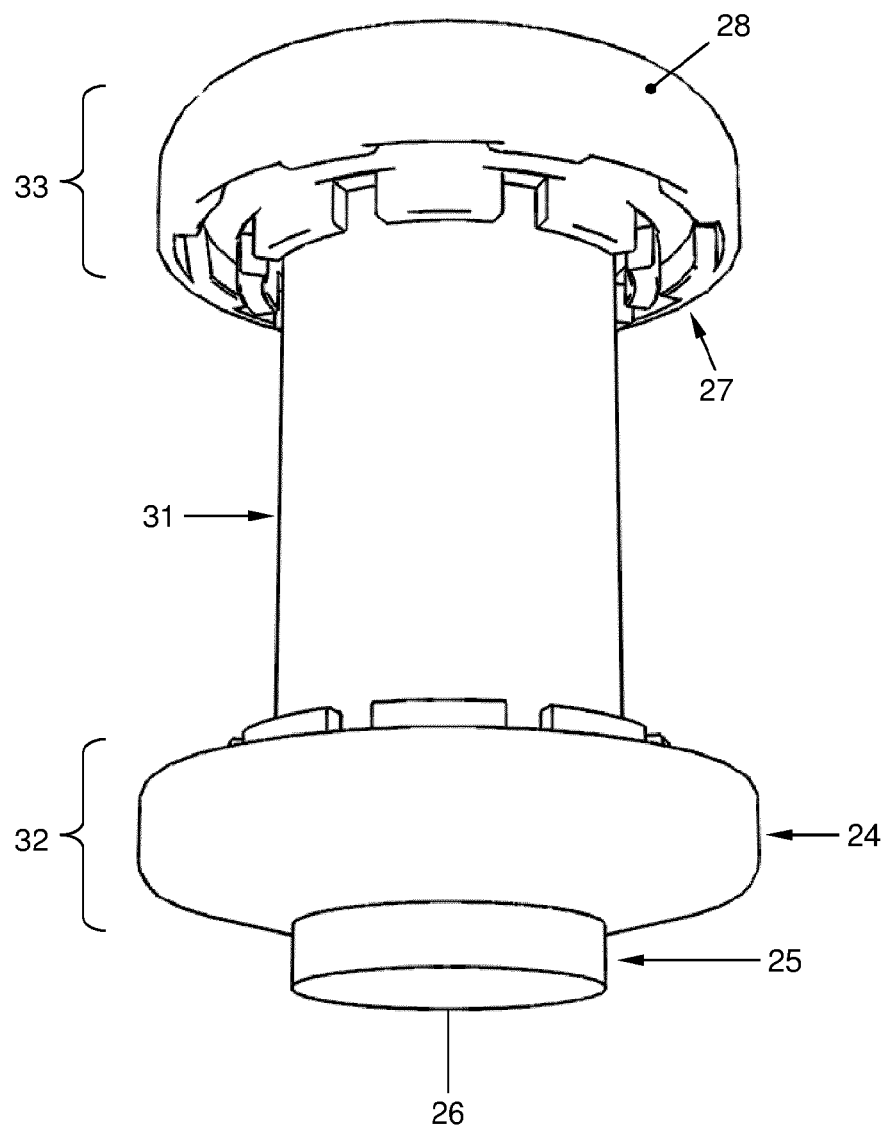

FIG. 5 shows, in a perspective view, the cartridge together with the punch-fill adapter and the handgrip adapter of FIG. 4 again, however this time when these two adapters are connected to the cartridge.

Figure 6:
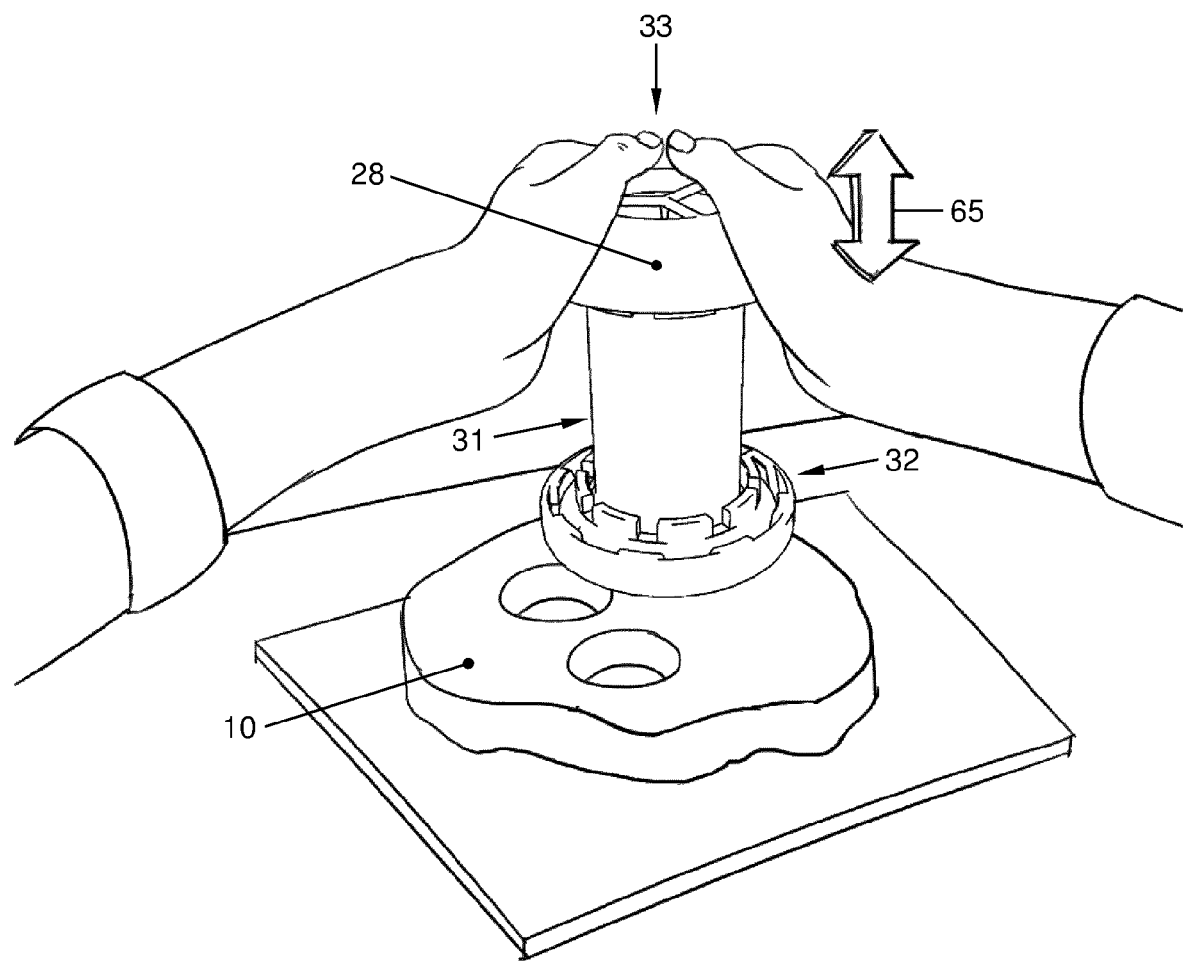

FIG. 6 shows, in a perspective view, the cartridge assembly of FIG. 5 again, however this time during punching, via the cutting edge of the punch-fill adapter, of slices out of a supply slice of a pasta dough, while the cartridge assembly is manually maneuvered via the handgrip area of the handgrip adapter.

The reference signs used in the abovementioned FIGS. 1-6 are referring to the abovementioned parts and aspects of the invention, as well as to related parts and aspects, in the following manner.

Figure 1:
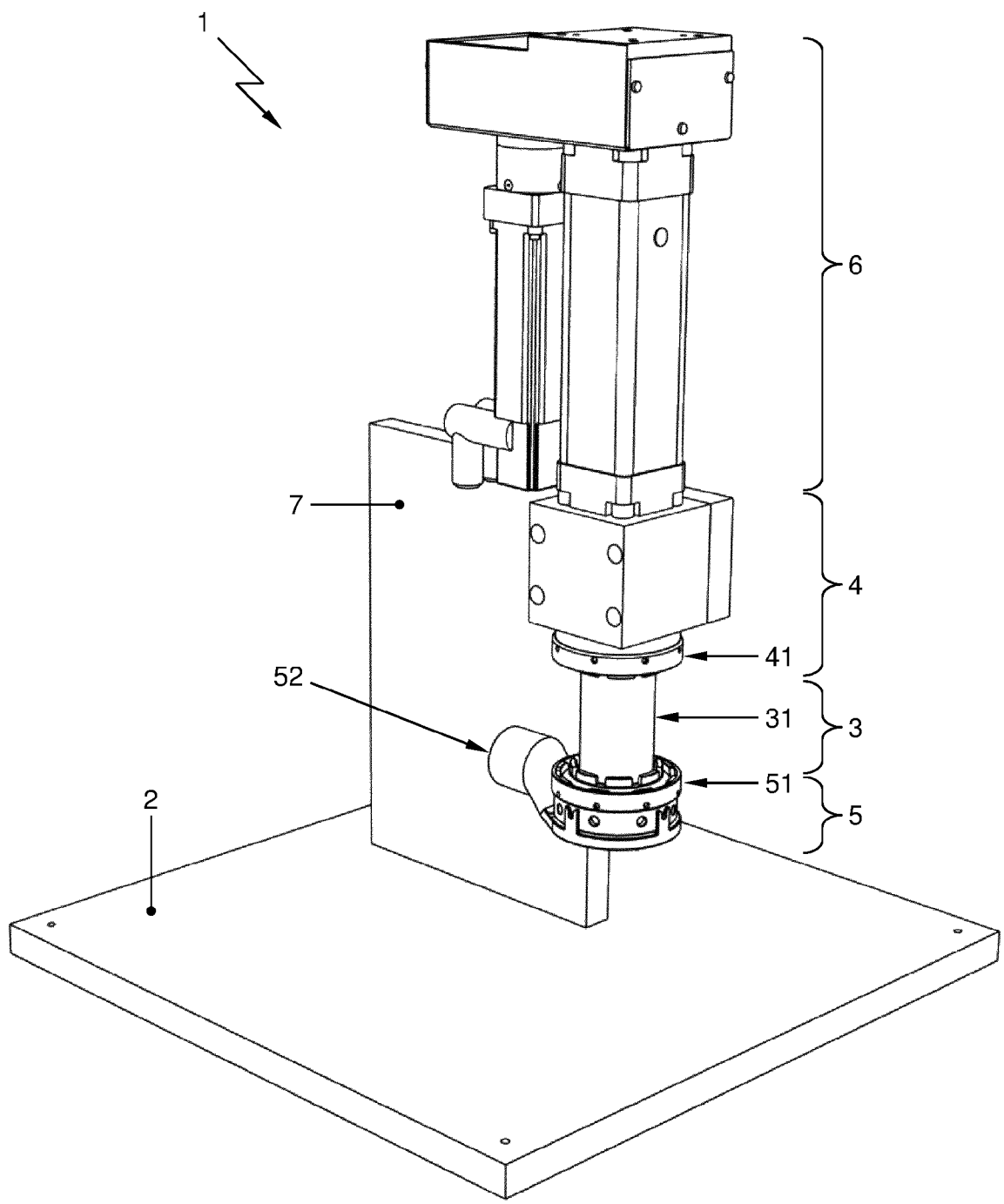
FIG. 1 shows, in a perspective view, an example of an embodiment of a 3D printer system according to the invention, wherein the first interconnection between the cartridge and the plunger assembly and the second interconnection between the cartridge and the printhead assembly are effective.

1 3D printer system
2 support structure
3 cartridge assembly
4 plunger assembly
5 printhead assembly
6 plunger actuating mechanism
7 3D movement mechanism
10 plastic substance (pasta dough)
21 first cartridge connector
22 second cartridge connector
23 circumferential wall
24 punch-fill connector
25 cutting ring
26 circumferential cutting edge
27 handgrip connector
28 handgrip area
31 cartridge
32 punch-fill adapter
33 handgrip adapter
41 plunger assembly connector
51 printhead assembly connector
52 hot air inlet Reference is first made to the 3D printer system 1 of FIG. 1. This system 1 is for printing food, more particularly for printing fresh pasta dough in various predetermined 3D shapes.

In practice one places a food plate on the support structure 2, below the printhead assembly 5. Then, in the operation condition of the system 1, the plunger actuating mechanism 6 is actuating the plunger of the plunger assembly 4 to move within the cylindrical inner space of the cartridge 31 to thereby push the pasta dough successively out of the cartridge 31, through the printhead assembly 5, out of the printhead assembly 5, and onto the food plate, while at the same time the 3D movement mechanism 7 is providing relative movement, according to a predetermined 3D movement trajectory, between the support structure 2, on the one hand, and the plunger assembly 4, the cartridge 31 and the printhead assembly 5, on the other hand.

As to FIG. 1 it is noted that, for reasons of simplicity, the 3D movement mechanism 7 has been depicted in a highly schematical manner only. It is furthermore noted that, also for reasons of simplicity, the plunger of the plunger assembly 4 is not visible in FIG. 1. This plunger is located within the interior of the plunger assembly 4 to perform its vertical movements relative to the cartridge 31. Therein, a downward movement of the plunger within the inner space of the cartridge 31 evidently corresponds to pushing the pasta dough out of the cartridge 31 in the abovedescribed manner. Furthermore, as to FIG. 1, it is noted that the reference numeral 52 indicates a hot air inlet of the printhead assembly 5. This hot air inlet 52 may be used for hot air supply to quickly dry the pasta dough during the final stages of the pasta dough being processed and dispensed by the printhead assembly 5.

When the pasta dough has been printed on the food plate in the predetermined 3D shape, e.g. the 3D shape of a nice flower or the like, the printed shape can then be placed in boiling water for a short time (e.g. one or two minutes), to get it ready for serving a dish.

Figure 2:
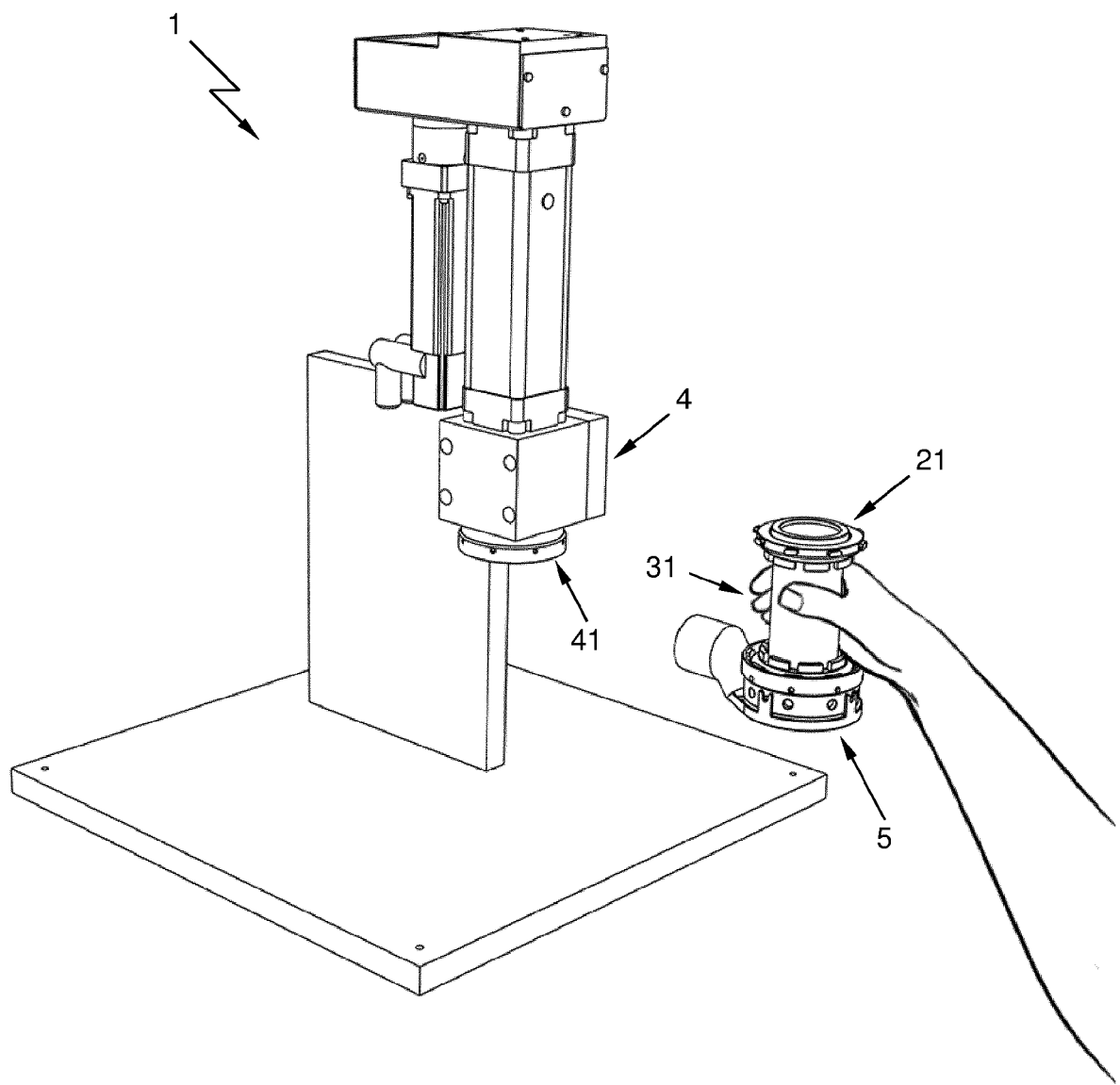
FIG. 2 shows the situation of FIG. 1 again, however this time while a user is taking the mutually interconnected cartridge and printhead assembly out of the printer system, just after the user has disconnected the first interconnection between the cartridge and the plunger assembly.

When the cartridge 31 has to be refilled with new pasta dough, the cartridge 31 has to be removed from the 3D printer system 1 of FIG. 1. This removal of the cartridge 31 is illustrated by FIGS. 2 and 3. FIG. 2 shows that a user is taking the mutually interconnected cartridge 31 and printhead assembly 5 out of the printer system 1, just after the user has disconnected the first interconnection between the first cartridge connector 21 of the cartridge 31 and the plunger assembly connector 41 of the plunger assembly 4. FIG. 3 shows the cartridge 31 and printhead assembly 5 again, however this time after the user has further disconnected the second interconnection between the second cartridge connector 22 of cartridge 31 and the printhead assembly connector 51 of printhead assembly 5. The disconnection action related to said second interconnection has been schematically illustrated by means of the shown arrow 61. It is noted that in the shown example said first interconnection and said second interconnection each are bayonet interconnections.

FIGS. 4 and 5 show the manually releasable fourth interconnection between the second cartridge connector 22 of the cartridge 31 and the punch-fill connector 24 of the punch-fill adapter 32, as well as the manually releasable fifth interconnection between the first cartridge connector 21 of the cartridge 31 and the handgrip connector 27 of the handgrip adapter 33. It is seen that these fourth and fifth interconnections, just like said first and second interconnections, each are bayonet interconnections. The connection action related to said fifth interconnection has been schematically illustrated by means of the shown arrow 64 in FIG. 4. The connection actions related to said fourth interconnection have been schematically illustrated by means of the shown arrows 62 and 63 in FIG. 4. It is seen that in the shown example the punch-fill adapter 32 consists of two separate parts, i.e. the punch-fill connector 24 and the cutting ring 25. Arrow 62 in FIG. 4 illustrates the insertion of the cutting ring 25 into the punch-fill connector 24, while arrow 63 in FIG. 4 illustrates the connection action of the punch-fill connector 24, together with the inserted cutting ring 25, onto the second cartridge connector 22. It is noted that the punch-fill adapter does not necessarily have to be a two-part piece as illustrated. Alternatively, it may also be a one-part piece, or it may consist of more than two separate parts.

FIG. 6 shows how by means of the punch-fill adapter slices can be punched out of a supply slice of a pasta dough 10, while the cartridge assembly is manually maneuvered via the handgrip area 28 of the handgrip adapter 33. The downwardly directed part of the two-way arrow 65 in FIG. 6 illustrates the downwardly directed punching movement. The upwardly directed part of the two-way arrow 65 in FIG. 6 illustrates the upward movement after a punched slice has been taken into the cartridge 31. In the shown example, two punched slices have already been taken into the cartridge 31, while a third punched slice is underway. If, after some time, the supply slice of dough 10 contains too many punched-out parts, it may be flattened again by means of dough rolling pin, while adding additional dough thereto, if desirable.

It is noted that in the present document the word "cylindrical", as used in the terms "cylindrical inner surface" and "cylindrical inner space" may for example refer to the shape of a circular cylinder, i.e. a cylinder having a circular base form. However, as used herein, the word "cylindrical" more generally refers to the broader mathematical definition of a cylinder, according to which broader definition a cylinder may have any arbitrary base form, such as an elliptical base form, a polygonal (e.g. square) base form, etcetera.

While the invention has been described and illustrated in detail in the foregoing description and in the drawing figures, such description and illustration are to be considered exemplary and/or illustrative and not restrictive; the invention is not limited to the disclosed embodiments.

For example, in the shown example, all of the described possible interconnections between a respective connector of the cartridge, on the one hand, and a corresponding connector of the plunger assembly, the printhead assembly, the punch-fill adapter, or the handgrip adapter, on the other hand, are bayonet interconnections. However, other than bayonet interconnections may be applied as well.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single other unit may fulfill the functions of several items recited in the claims. For the purpose of clarity and a concise description, features are disclosed herein as part of the same or separate embodiments, however, it will be appreciated that the scope of the invention may include embodiments having combinations of all or some of the features disclosed. Any reference signs in the claims should not be construed as limiting the scope.

The invention claimed is:

1. A 3D printer system for printing a plastic substance, such as a dough, wherein the 3D printer system comprises:
   a support structure;
   a cartridge assembly, comprising a refillable cartridge, which cartridge comprises a circumferential wall having a cylindrical inner surface defining a cylindrical inner space of the cartridge for holding said plastic substance therein, said circumferential wall being provided with a first cartridge connector and a second cartridge connector at the two opposing longitudinal ends of the cartridge, respectively;
   a plunger assembly, comprising a plunger and a plunger assembly connector, wherein the first cartridge connector and the plunger assembly connector are configured to cooperatively form a manually releasable first interconnection between the cartridge and the plunger assembly; and
   a printhead assembly, comprising a printhead assembly connector, wherein the second cartridge connector and the printhead assembly connector are configured to cooperatively form a manually releasable second interconnection between the cartridge and the printhead assembly;
   wherein the 3D printer system has an operation condition, in which:
   said cylindrical inner space of the cartridge contains said plastic substance;
   said first interconnection and said second interconnection are effective;
   the plunger is configured for movement, upon actuation, within said cylindrical inner space to thereby push the plastic substance successively out of the cartridge, through the printhead assembly, and out of the printhead assembly; and
   the 3D printer system is configured to provide relative movement, according to predetermined 3D movement trajectories, between said support structure, on the one hand, and at least the plunger assembly, the cartridge and the printhead assembly, on the other hand;
   wherein the cartridge assembly further comprises a punch-fill adapter having a circumferential cutting edge and being provided with a punch-fill connector, wherein:
   the first cartridge connector and the punch-fill connector are configured to cooperatively form a manually releasable third interconnection between the cartridge and the punch-fill adapter, when said first interconnection is manually released; and/or
   the second cartridge connector and the punch-fill connector are configured to cooperatively form a manually releasable fourth interconnection between the cartridge and the punch-fill adapter, when said second interconnection is manually released;
and wherein the cartridge assembly has a punch-fill condition, in which:
said third interconnection or said fourth interconnection is effective;
said circumferential cutting edge is arranged in-line, as seen in longitudinal direction of the cartridge, with the cross-sectional circumferential geometry of the cylindrical inner surface of the circumferential wall of the cartridge;
said circumferential cutting edge defines a fill-opening towards the inner space of the cartridge; and
the cartridge assembly is effective as a manual tool for punching, by said circumferential cutting edge, punched slices out of a supply slice of said plastic substance, and thereby for simultaneously and automatically inserting said punched slices, via said fill-opening, into the inner space of the cartridge.

2. The 3D printer system according to claim 1, wherein the cartridge assembly further comprises a handgrip adapter having a handgrip area and being provided with a handgrip connector, wherein:
the first cartridge connector and the handgrip connector are configured to cooperatively form a manually releasable fifth interconnection between the cartridge and the handgrip adapter, when said first interconnection is manually released; and/or
the second cartridge connector and the handgrip connector are configured to cooperatively form a manually releasable sixth interconnection between the cartridge and the handgrip adapter, when said second interconnection is manually released;
and wherein the cartridge assembly has a handgrip condition, in which:
said fifth interconnection or said sixth interconnection is effective; and
said handgrip area can manually be taken hold of during said punching.

3. A method for filling the cartridge of the cartridge assembly of the 3D printer system according to claim 1 with a plastic substance, the method comprising using the cartridge assembly in the punch-fill condition as said manual tool for punching, by pressing the circumferential cutting edge of the punch-fill adapter of the cartridge assembly into said supply slice of said plastic substance to form said punched slices out of said plastic substance, and thereby simultaneously and automatically inserting said punched slices, via said fill-opening, into the inner space of the cartridge.

4. The method according to claim 3, wherein the cartridge assembly further comprises a handgrip adapter having a handgrip area and being provided with a handgrip connector, wherein:
the first cartridge connector and the handgrip connector are configured to cooperatively form a manually releasable fifth interconnection between the cartridge and the handgrip adapter, when said first interconnection is manually released; and/or
the second cartridge connector and the handgrip connector are configured to cooperatively form a manually releasable sixth interconnection between the cartridge and the handgrip adapter, when said second interconnection is manually released;
and wherein the cartridge assembly has a handgrip condition, in which:
said fifth interconnection or said sixth interconnection is effective; and
said handgrip area can manually be taken hold of during said punching,
and wherein, during said use of the cartridge assembly in its punch-fill condition, the handgrip area of the cartridge assembly is manually being taken hold of during said punching.

5. The method of claim 3, wherein the plastic substance is a dough.

* * * * *